US005605730A

United States Patent [19]

Treleaven

[11] Patent Number: 5,605,730

[45] Date of Patent: Feb. 25, 1997

[54] LABEL

[75] Inventor: Carl W. Treleaven, Greensboro, N.C.

[73] Assignee: Westlake Ventures, L.L.C., Greensboro, N.C.

[21] Appl. No.: 327,386

[22] Filed: Oct. 21, 1994

Related U.S. Application Data

[63] Continuation-in-part of Ser. No. 259,856, Jun. 15, 1994.

[51] Int. Cl.$^6$ .................................. B32B 3/00; G09F 3/00

[52] U.S. Cl. .................................. 428/40.1; 281/2; 281/5; 283/81; 428/41.7; 428/41.8; 428/41.9; 428/42.1; 428/192; 428/194; 428/914

[58] Field of Search .............................. 428/40, 914, 194; 283/81; 281/5, 12

[56] References Cited

U.S. PATENT DOCUMENTS

| | | | |
|---|---|---|---|
| 4,991,878 | 2/1991 | Cowan | 283/81 |
| 5,207,746 | 5/1993 | Jones | 283/81 |
| 5,262,214 | 11/1993 | Instance | 428/40 |
| 5,403,636 | 4/1995 | Crum | 428/40 |

*Primary Examiner*—Nasser Ahmad

*Attorney, Agent, or Firm*—Rhodes, Coats & Bennett, L.L.P.

[57] ABSTRACT

A label product including a web of double coated tape or, in the alternative, an adhesive transfer tape, and a plurality of outserts affixed thereto.

The web of double coated tape includes a release liner having an upper surface and a carrier having an upper surface and a lower surface. The lower surface of the carrier is coated with a first adhesive layer and the upper surface of the carrier is coated with a second adhesive layer. The carrier is releasably secured to the upper surface of the release liner by the first adhesive layer and the outserts are positioned in spaced relation to one another along the web. The web of adhesive transfer tape includes a release liner having an upper surface and an adhesive layer coating the upper surface. The outserts are positioned in spaced relation to one another along the web.

10 Claims, 8 Drawing Sheets

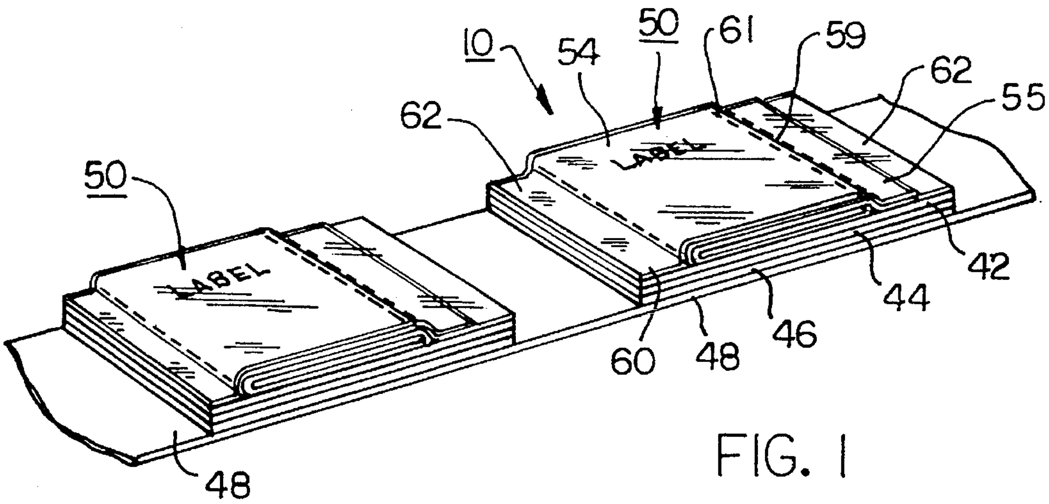
FIG. 1
FIG. 2
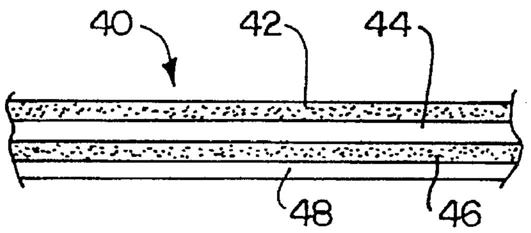
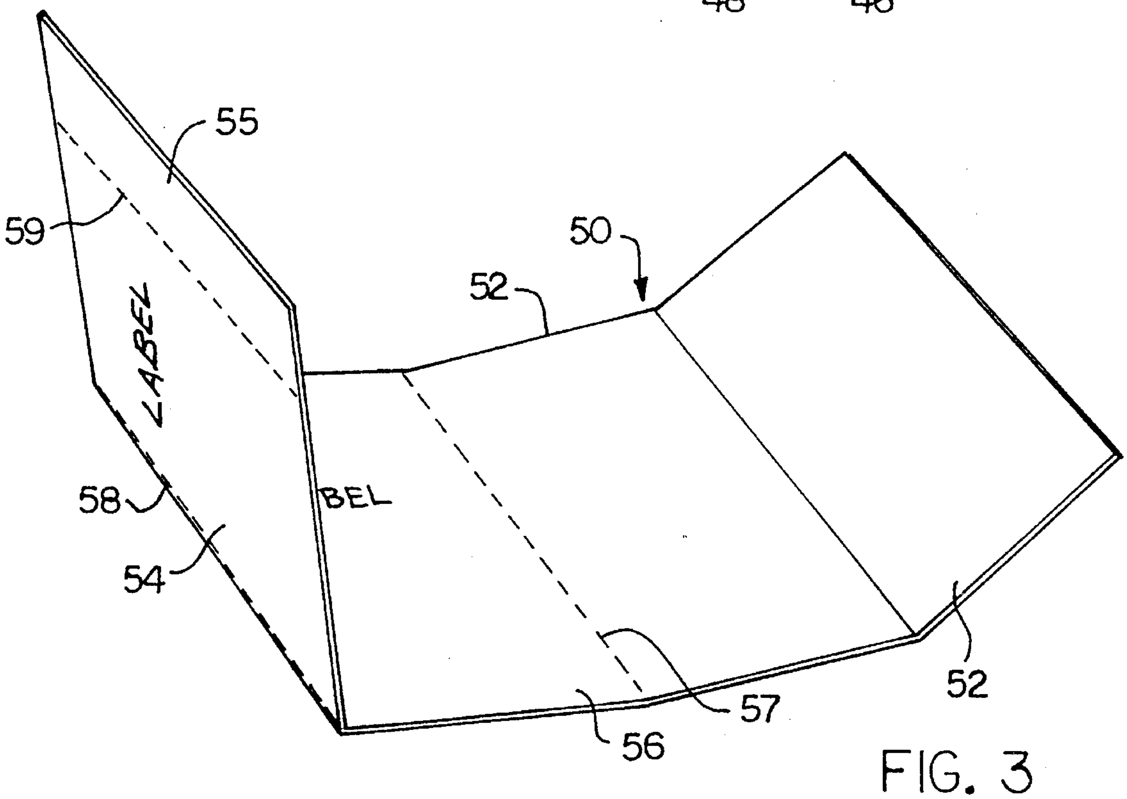
FIG. 3

LABEL

This application is a continuation-in-part of application Ser. No. 08/259,856 filed on Jun. 15, 1994 pending.

FIELD OF THE INVENTION

The present invention is directed to a package label and method of forming a package label, and, more particularly, to an adhesive backed label having an outsert carried thereon and a method for forming the same from a double coated adhesive tape or an adhesive transfer tape.

BACKGROUND OF THE INVENTION

In the packaging of certain chemicals and pharmaceuticals, the manufacturer is often required or desires to provide a considerable amount of information concerning the chemical or pharmaceutical. In the case of chemicals and pharmaceuticals, this is required by government regulations. However, the occasion may also arise, either separate from or in conjunction with government regulations, to provide the doctor, pharmacist or user with instructions on how the product should be used, what the product is, and safety precautions which should be followed in the use of the product. Sometimes the literature, which is generally in the form of folded leaflets, is placed within a box along with the container carrying the chemical or pharmaceutical (referred to as "inserts"). At the same time, in addition to the insert, a primary label must be applied to the outside of the package to remain therewith. This requires a second assembly operation. The placement of leaflets within the box is expensive and a cumbersome operation to perform. Also, it is difficult as well as expensive to insure by later inspection that the proper literature has been inserted in the proper package.

A different approach to solving this problem has developed over the last several years in which the folded literature or leaflets are releasably attached to a face of the container (referred to as "outserts"), either directly to the container itself, or to a base label which, in turn, is secured to the container. The literature may then be removed by the customer. In many of such cases, the portion of the label remaining on the container must carry both an "identification" of the product defined as information such as trademark and/or product identification number, manufacturer and location, etc., as well as certain "statutory information" (defined as lot number and expiration date).

Thus, in order to meet the objectives of such labeling techniques, certain criteria must be met. First of all, the portion of the label which remains after the folded literature is removed must contain both the identification of the product, as well as the statutory information concerning the lot number and expiration date. Further, after the literature leaflet is assembled or affixed to the base label, the indicated area for statutory information concerning lot number and expiration date must be accessible for stamping or printing by the pharmaceutical company at the time the pharmaceutical product is manufactured and packaged. This information must be visible to the consumer in addition to the identification of the product. The folded leaflet portion remains affixed to the label portion until the customer (doctor, pharmacist, consumer) desires its removal. It is critical that the proper literature must be affixed to the proper base label. Finally, all of the above criteria must be accomplished in a manufacturing technique that insures quality and is cost-effective.

Examples of types of labels in the prior art which have addressed some of these criteria are described in U.S. Pat. Nos. 1,273,105 to VanDyke et al.; 4,621,837 to Mack; and 4,323,608 to Denny et al. They are examples of labels which have removable portions thereto.

In U.S. Pat. Nos. 5,207,746 and 5,263,743 to Jones, there are disclosed label constructions whereby the underlying base label is eliminated. The literature, base label, and area for statutory information are all combined into a unitary or integral product. The label constructions as disclosed therein have a bottom identification panel which is adhered to a package by means of a pressure sensitive adhesive coating on its underside. To facilitate handling, the labels are preferably mounted on a silicone coated release liner.

Three methods are known for applying adhesive to a folded leaflet or to the underside of a separate base label as taught in the prior art. An adhesive patch may be applied to the upper surface of a release liner followed by the placement of an outsert or base label thereon. Alternatively, adhesive may be applied to the underside of the bottom panel of the outsert or to the underside of the base label followed by the placement of the outsert or base label onto the release liner. Finally, a continuous layer of adhesive may be applied to the release liner followed by the placement of outserts or base labels thereon.

Each of the above-described methods for applying pressure sensitive adhesive suffers significant drawbacks and limitations. For the first two methods, it is generally necessary to coordinate the application of adhesive and bottom panels or base labels to insure proper registration. If patches of adhesive are used, they must be completely covered by the outserts or base label to avoid binding when the strip of labels is ultimately rewound and unwound. Where adhesive is applied on the underside of the bottom panel or base label, it is necessary to stop applying when an outsert or base label is not in place to avoid applying adhesive over the work area.

If a continuous strip of adhesive is applied to the release liner, either a continuous base stock must be applied or the excess adhesive must be removed prior to placement of the base labels or outserts thereon. If the adhesive is to be removed, then the outsert or base label placement must be coordinated as discussed above with regard to adhesive patches.

Thus, there exists a need for a method for forming pressure sensitive adhesive backed labels mounted on a release liner which does not require an adhesive applying station. Furthermore, there exists a need for such a label construction method wherein the bottom panel of an outsert becomes adhesive coated and is designed to remain with the associated package as a primary label when the remainder of the outsert is removed.

SUMMARY OF THE INVENTION

The present invention is directed to a pressure sensitive adhesive backed outsert and a method for forming the same. According to the present invention, the leaflets or outserts are temporarily affixed to what is known as "double coated tape" or, alternatively, to adhesive transfer tape.

"Double coated tape", as used herein, includes a silicone release liner and a first layer of adhesive covered by a carrier which is in turn coated with a second adhesive layer. The first layer of adhesive is releasably mounted on the liner while the carrier is permanently coated on opposite sides by the first and second adhesive layers. Preferably, the carrier is a relatively thin polypropylene film. Labels having varying advantages and characteristics may be formed by the following methods of forming labels utilizing the double coated tape as described above.

Labels according to a first embodiment may be formed by the following method. Outserts or the like are placed on the second layer of adhesive. A layer of clear film laminate is then placed over the outsert and is secured to the tape along the portion of the second layer of adhesive not covered by the outserts. The construction is then diecut about the periphery of the outsert so that a border is formed adjacent to at least two sides of the outsert. The waste matrix is then removed. Because a laminate cover is provided, a non-coated and/or non-varnished printing stock may be used to form the outsert. Further, the laminate protects the booklet and provides greater integrity to the label.

Labels according to a second embodiment may be constructed by the following method. The unwound, double coated tape is diecut through the carrier and both layers of adhesive to the release liner to form patches of the size (or smaller) and shape of the object to be carried thereon, e.g., an outsert. The unwanted portion of the tape or the waste matrix is then removed from the liner. The outserts or the like are then placed on the patches.

Labels according to a third embodiment may be formed by the following method. A deadening agent (a substance which removes the adherent property of adhesive) is applied to the exposed adhesive such that a portion of adhesive remains exposed. The outserts are placed on the exposed portion of the second layer of adhesive. The tape is then diecut leaving a border around the outsert, through the two adhesive layers and carrier down to the liner and the waste matrix is removed. It will be appreciated that the "deadened" adhesive will not cause binding when the strip of labels is wound.

"Adhesive transfer tape", as used herein, includes a silicon release liner merely covered by an adhesive layer without a carrier or polypropylene layer. The adhesive is releasable from the liner. Labels having varying advantages and characteristics may be formed by the following methods of forming labels using the transfer tape as described.

Labels according to a fourth embodiment may be formed by the following method. Outserts or the like are placed on the layer of adhesive. A layer of clear film laminate is then placed over the outsert and is secured to the tape along the portion of the layer of adhesive not covered by the outserts. The construction is then diecut about the periphery of the outsert so that a border is formed adjacent to at least two sides of the outsert. The waste matrix is then removed. Because a laminate cover is provided, a non-coated and/or non-varnished printing stock may be used to form the outsert. Further, the laminate protects the booklet and provides greater integrity to the label.

As an alternative to the preceding method, labels according to the fourth embodiment may be formed by the following method. First, the transfer tape is unwound from a roll. A multiple up book is then placed on the adhesive layer. A clear laminate having adhesive on the side facing the transfer tape is then applied over the transfer tape and the multiple up books. The laminate and books are then face cut down to the release liner, creating two or more side-by-side individual outserts from each multiple up book. The waste matrix including the adhesive between the individual outserts and the outsert waste portion between the individual outserts is then removed by pulling up the clear laminate.

Labels according to a fifth embodiment may be formed by the following method. The transfer tape is unwound and outserts or the like are placed thereon. Multiple outsert applying magazines may be used. A non-adhesive laminate is placed over the web and the outserts, and the construction is passed through a nip roller. The laminate, along with the adhesive not covered by the outsert, is then removed.

As an alternative to the preceding method, labels according to the fifth embodiment may be formed by the following method. First, the transfer tape web is unwound and multiple up books are placed thereon. The multiple up books are then face cut, creating the foot print of the individual outserts and the respective labels. Next, a second web of clear laminate material having no adhesive is unwound. The clear laminate is run through a print station which applies a band of adhesive in the web direction. The bands are sized and configured to run between each of the individual outserts, being approximately the same width as the outsert waste portions. Next, the clear laminate material with the adhesive bands is laminated to the transfer tape and outserts. The laminate material is removed. Removal of the laminate material pulls up the exposed adhesive between the multiple outserts and pulls away the waste material between the parts of the multiple up respective outserts.

Labels according to a sixth embodiment may be formed by the following method. A deadening agent is applied to the exposed adhesive such that a portion of adhesive remains exposed. The outserts are placed on the exposed portion of the layer of adhesive. It will be appreciated that the "deadened" adhesive will not cause binding when the strip of labels is wound.

As an alternative to the preceding method, labels according to the sixth embodiment may be formed by the following method. First, adhesive deadener is applied to the unwound transfer tape web at areas where no books are to be applied. Next, multiple up books are placed on the web. The multiple web books are then face cut to the release liner to form individual outserts. Bands of adhesive are applied to a clear laminate material and the laminate material is then laminated to the transfer tape. Thereafter, the laminate material is removed, taking up the outsert waste portions therewith.

It is an object of the present invention to provide a label of the type including an outsert or leaflet having a pressure sensitive adhesive backing.

It is another object of the present invention to provide a label of the type described which creates a unitary construction which carries both the primary label and the information normally carried separately on an insert or outsert.

It is an object of the present invention to provide a method for forming a label as described above.

It is an object of the present invention to provide a label as described above, which does not require the application of adhesive to the label or the leaflet.

It is an object of the present invention to provide a method as described above which is cost effective and convenient.

It is an object of the present invention to provide a label as described above which may also include a laminate cover and a method for forming the same.

BRIEF DESCRIPTION OF THE DRAWINGS

FIG. 1 is a perspective view of a first embodiment according to the present invention.

FIG. 2 is a side elevational view of a section of the double coated tape of the present invention.

FIG. 3 is a perspective of a typical type of outsert intended for use in the preferred embodiment of the present invention.

DETAILED DESCRIPTION OF THE INVENTION

As used herein, the term "outsert" means any type of outsert, leaflet, sheet, or the like for carrying information thereon and/or serving as a primary label.

The unique aspect of the present invention resides in the use of the double coated tape 40 or, in the alternative, adhesive transfer tape 540 to which the outserts or leaflets are affixed and the manner in which the labels are produced.

Figure 5:
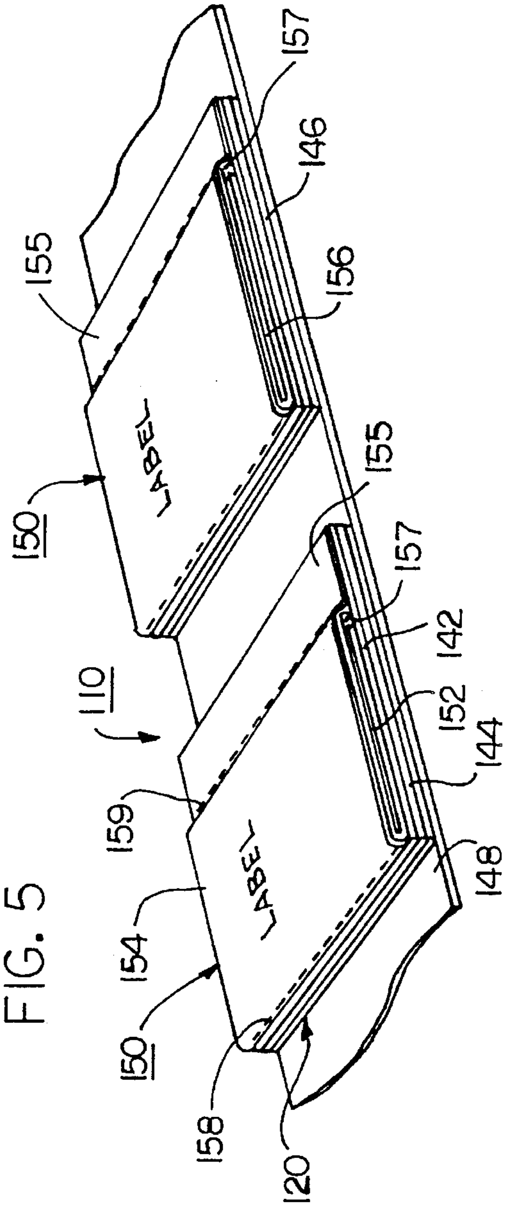
FIG. 5 is a perspective view of a second embodiment of the present invention.
Figure 7:
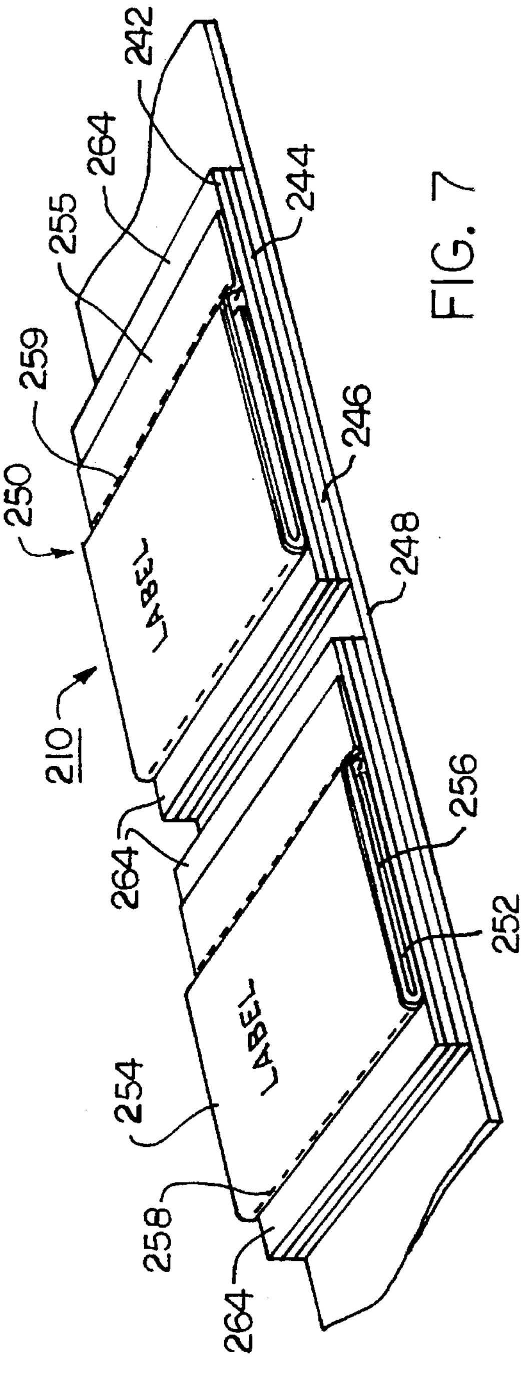
FIG. 7 is a perspective view of a third embodiment according to the present invention.

Referring now to FIGS. 1, 5, and 7, first, second, and third embodiments of the present invention, respectively, are shown therein, each being formed from double coated tape. Label 10 of FIG. 1 includes a film laminate cover. Label 110 of FIG. 5 is unlaminated and is formed without a border surrounding the outsert. Label 210 of FIG. 7 is likewise unlaminated but includes a border 264 surrounding the outsert in which the adhesive has been removed.

The double coated tape 40 is best seen in FIG. 2. Tape 40 includes liner 48, adhesive layer 46, carrier 44, and second adhesive layer 42. Adhesive layers 46, 42 are preferably formed from pressure sensitive adhesive. Carrier 44 is preferably formed from a polypropylene substrate having a thickness of between 0.5 mil (0.0005 inch) and 4.5 mils (0.0045 inch). Double coated tape such as 3M Scotch Brand Tape product number 9458 is exemplary of one product which may be used. Double coated tapes having a second release liner layer located on second adhesive layer 42 may also be used. Note that the relative size of the tape and thickness of the layers has been exaggerated in the drawings for the sake of clarity. Preferably, layers 42, 44, 46 which remain with label 10 when the same is removed from liner 48 will appear as a thin adhesive film on the lower surface of bottom panel 56.

Referring now to FIGS. 1–4 in general and to FIG. 1 in particular, a first and preferred embodiment of the label of the present invention, generally denoted 10, is shown therein. Label 10 includes a supporting patch 22 formed from the polypropylene layer 44, which is releasably secured to release liner 48, and outsert 50 which is secured to the top of patch 22. Laminate cover 60 covers both outsert 50 and its support patch 22.

Outsert 50, as best seen in FIG. 3, is preferably of the type disclosed in U.S. Pat. No. 5,263,743. However, it will be appreciated that other types of outserts, leaflets, sheets and the like may be used. Outsert 50 includes bottom panel 56, title panel 54, marginal edge portion 55, and intermediate panels 52. Tear lines 57 and 58 are provided between bottom panel 56 and panels 52 and 54, respectively. Tear line 59 is provided between panel 54 and marginal edge portion 55. Bottom panel 56 and the inner surface of marginal edge portion 55 are adhered to second adhesive layer 42. Depending on the application, outserts may be used which do not have marginal edge portion 55 and/or one or more of tear lines 59, 58, and 57. If marginal edge portion 55 is not used, it may be preferable to apply adhesive between the underside of panel 54 and the mating surface of panel 52. Statutory information may be printed on panels 54, 56, or borders 62, 264 (as described below) and/or the laminate cover.

Patch 22 is somewhat larger than outsert 50, thereby forming borders 62. Film layer 60 is formed by a preferably clear film secured to patch 22 along the peripheral portion of second adhesive layer 42 located in borders 62. Preferably, laminate 60 does not have adhesive on its inner surface so that it covers outsert 50 without adhering to the same. Laminate 60 serves to protect outsert 50 from damage during handling of the package. Laminate 60 is provided with a perforation 61 to facilitate access to the outsert.

Label 10 according to the first embodiment may be constructed as follows and with reference to FIG. 4. A continuous strip of tape 40 is removed from a roll, or unwinding station 340 as described above such that second adhesive layer 42 faces upwardly. A succession of outserts 50 are fed from a supply hopper or outsert applying station 350 at spaced intervals along tape 40. Station 350 preferably applies outserts in response to photodetector 352 whose eye senses marks previously printed on the release liner. These marks may be printed after the roll is unwound using a printing station (not shown). A continuous layer of film 60 is fed from a supply roll or laminate applying station 360 over second adhesive layer 42 and outserts 50. It will be appreciated that laminate 60 will be adhered to the portion of adhesive layer 42 not covered by an outsert 50. Tape 40, laminate 60, and outsert 50 are then passed through nip rollers 362 to secure the assembly. A diecutter 370 forms perforation 61 in laminate 60 and a cut line framing each outsert. Perforation 61 goes only through the lamination. The cut line extends down through both adhesive layers 42, 46 and through carrier 44 to release liner 48. The cut line is preferably spaced from the edges of outsert 50 such that borders 62 are formed on two sides. Following the cutting operation, the resulting waste matrix 80 (i.e., those portions of layers 42, 44, 46, 50 and 60 not within the periphery of the cut lines) is removed from the construction at removal station 380. Upon removal of the waste matrix, labels 10 remain on release liner 48. The release liner and labels may be wound onto a take-up roll or winding station 390 or fan folded into a stack. The finished web may be slit longitudinally if desired, for example, to form a four wide or "four-up" label roll into four separate label rolls. It will be appreciated that because all of second adhesive layer 42 has been either removed or covered by laminate 60, the liner and labels may be subsequently unwound for use without binding. It will be appreciated from the foregoing that the method as described allows a margin of error for placement of the outsert and location of the diecut.

A label 110 according to a second embodiment of the present invention, best seen in FIG. 5, is formed without the use of a laminate cover. The numerals 158, 154, 150, 159, 155, 146, 144, 142, 152, 156, 148 and 157 indicate elements which correspond to elements 58, 54, 50, 59, 55, 46, 44, 42, 52, 56, 48, and 57, respectively, of the first embodiment. Label 110 includes a patch 120 identical to patch 22 of the first embodiment except that patch 120 is sized and shaped to fit at or within the periphery of outsert 150. It will be appreciated that because outsert 150 covers all of the second adhesive layer 142 of patch 120, the liner and labels may be rolled and unrolled without binding.

Labels 110 of the second embodiment may be constructed as follows and with reference to FIG. 6. Tape 140 is unwound from a roll at unwinding station 440. Tape 140 is diecut at cutting station 470 down to liner 148 and in the shape of patches 120. The resulting waste matrix 182 is then removed at removal station 480, leaving patches 120 on liner 148. As patches 120 pass under outsert applying station 450, outserts 150 are successively placed thereon whereby they are adhered to second adhesive layer 142. Resultant labels 110 may then be wound onto a roll by winding station 490. The order of steps as described above is preferred because it requires less exact placement of the cut lines. That is, patch 120 may be cut smaller than the area of outsert 150 to allow for error in the placement of outsert 150.

Labels 210 according to a third embodiment of the present invention, as best seen in FIG. 7, may be formed without a laminate cover while still providing a patch 222 which extends beyond the periphery of outsert 250. The numbers 258, 254, 250, 259, 255, 256, 242, 244, 246, 248, 252, and 222 indicate elements which correspond to elements 58, 54, 50, 59, 55, 56, 42, 44, 46, 48, 52 and 22, respectively, of the first embodiment. Label 210 includes patch 222 which is larger than outsert 250 such that borders 264 extend beyond the edges of outsert 50. The portions of second adhesive layer 242 which make up borders 264 are treated with a deadening agent such that they are no longer adherent. Deadening agents suitable for this purpose include product number FM1512 from K&W Printing, Inc., of Franklin Park, Ill. It will be appreciated that labels 210 mounted on release liner 248 may be rolled and unrolled without binding because no adherent adhesive is exposed.

Labels 210 according to the third embodiment may be formed as follows and with reference to FIG. 8. A continuous strip of tape 240 is unwound from a supply roll at unwinding station 540. A deadening agent is applied onto the construction by coating station 595 such that a portion of non-deadened adhesive remains exposed. Outserts 250 are then successively applied to the non-deadened adhesive on the upper surface of tape 240 at outsert applying station 550. At cutting station 570 diecuts are formed around each outsert 250 down to liner 248 such that borders 264 are formed thereabout. Alternatively, the cutting step may take place prior to the application of the outsert. The resultant waste matrix 280 is removed at removal station 580. The resulting labels 210 and liner 248 may then be rolled onto a roll by winding station 590. It will be appreciated from the foregoing that the method as described provides a margin of error for locating the outserts and the cut lines.

It will be appreciated that in each of the methods described above, if a double coated tape of the type having a second release liner is used, the second liner will be removed as a part of the unwinding step.

In each of the above-described methods, a plurality of individual outserts may be placed across the web using a corresponding number of outsert applying stations (not shown) spaced across the web. The web may thereafter be slit into individual webs, each having labels thereon.

Figure 13:
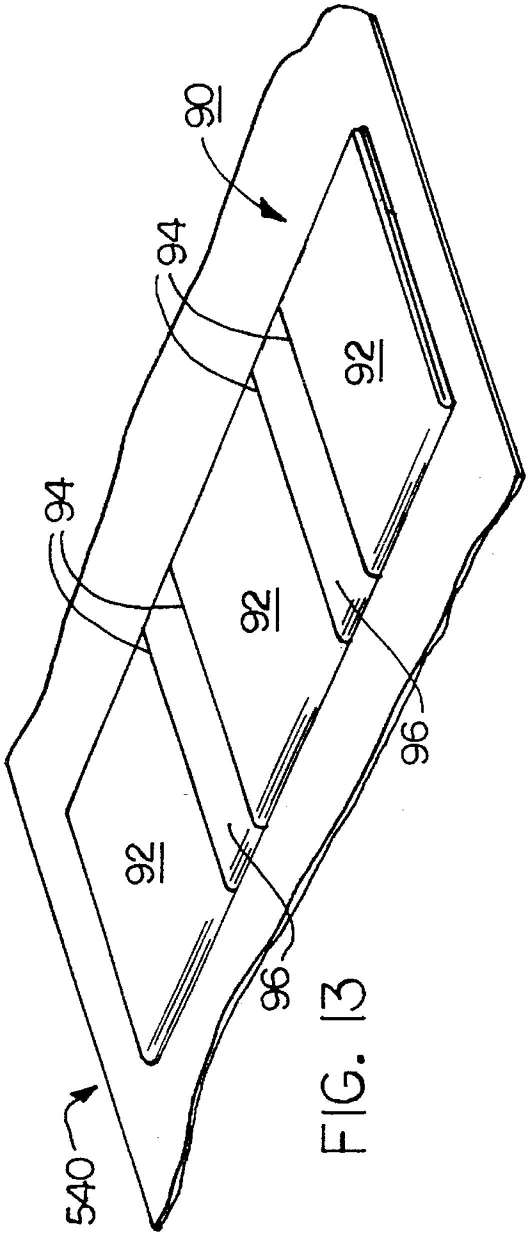
FIG. 13 is a perspective view of a web of adhesive transfer tape with a multiple up book placed on the upper surface thereof.

"Multiple up" books 90, as shown in FIG. 13, for example, are books which may be placed on the double coated tape, and subsequently cut into more than one complete individual outsert 92 such that a plurality of individual outserts will then extend across the web, which may or may not thereafter be slit into individual webs. Each outsert 92 will be substantially identical to outserts 50, 150, 250 as described above. Typically, a margin of about one-half inch is provided between individual outserts 92 so that, once the multiple up book is cut, there remain one or more waste portions of outsert material 96 between cut lines 94 that must be removed along with the other waste matrix materials. In each of the above-described methods, if multiple up books are used, the outsert waste portions will be removed along with the other waste matrix without further provision because of the construction of the double coated tape. More specifically, the outsert waste portions are disposed outside the diecut region of the labels. As the waste matrix is removed, the outsert waste portions 96 are pulled away from underneath by the adhesive and carrier layers which form a continuous substrate thereunder. That is, as the adjacent portions of the carrier and adhesive layers are pulled up, the portion beneath the outsert waste portion comes up as well, bringing the outsert waste portion with it.

Figure 8:
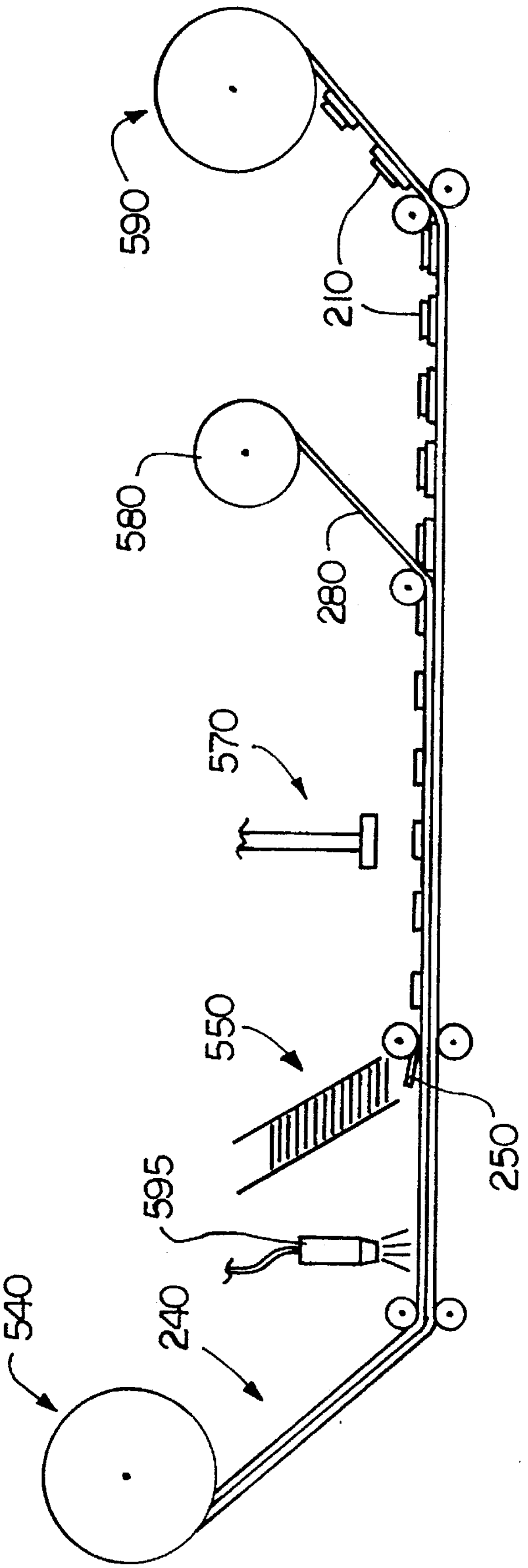
FIG. 8 is a diagrammatic side elevational view of an apparatus adapted to produce the labels of FIG. 7.
Figure 9:
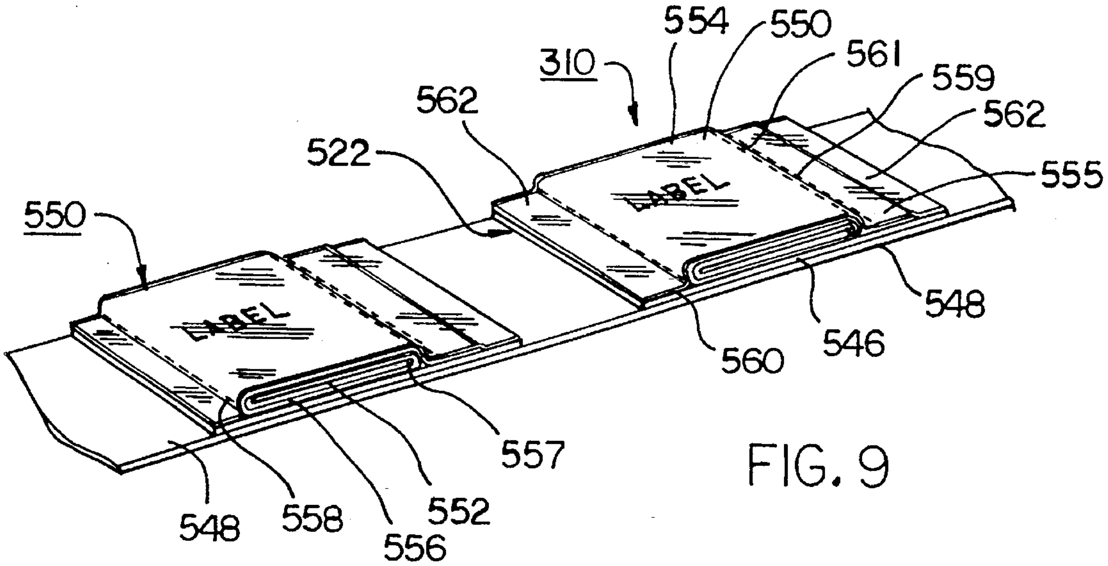
FIG. 9 is a perspective view of a fourth embodiment according to the present invention.
Figure 11:
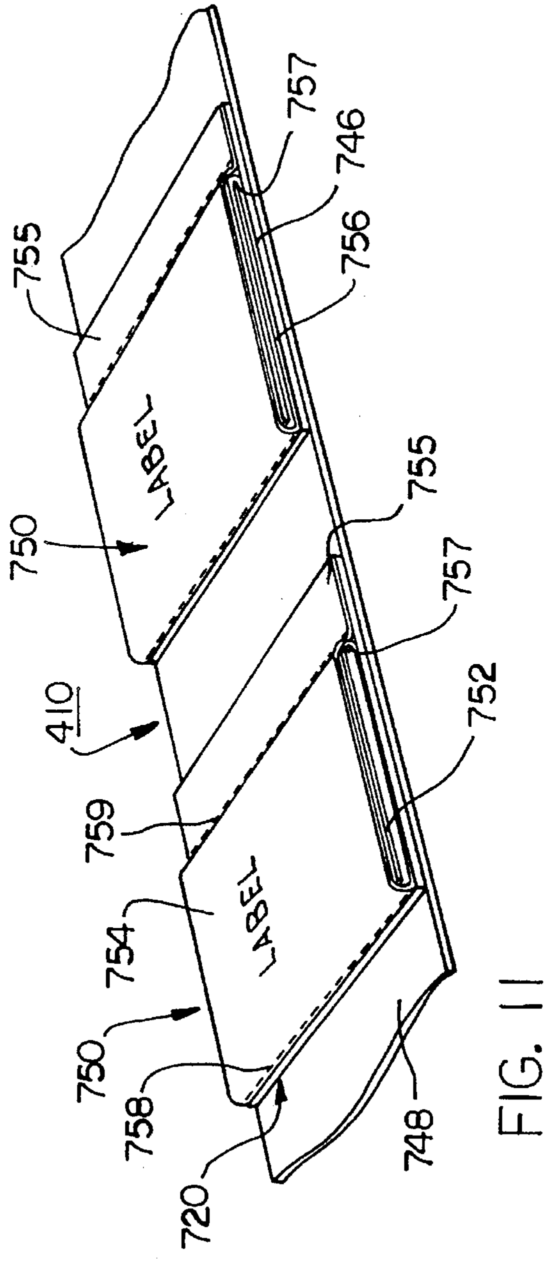
FIG. 11 is a perspective view of a fifth embodiment of the present invention.
Figure 12:
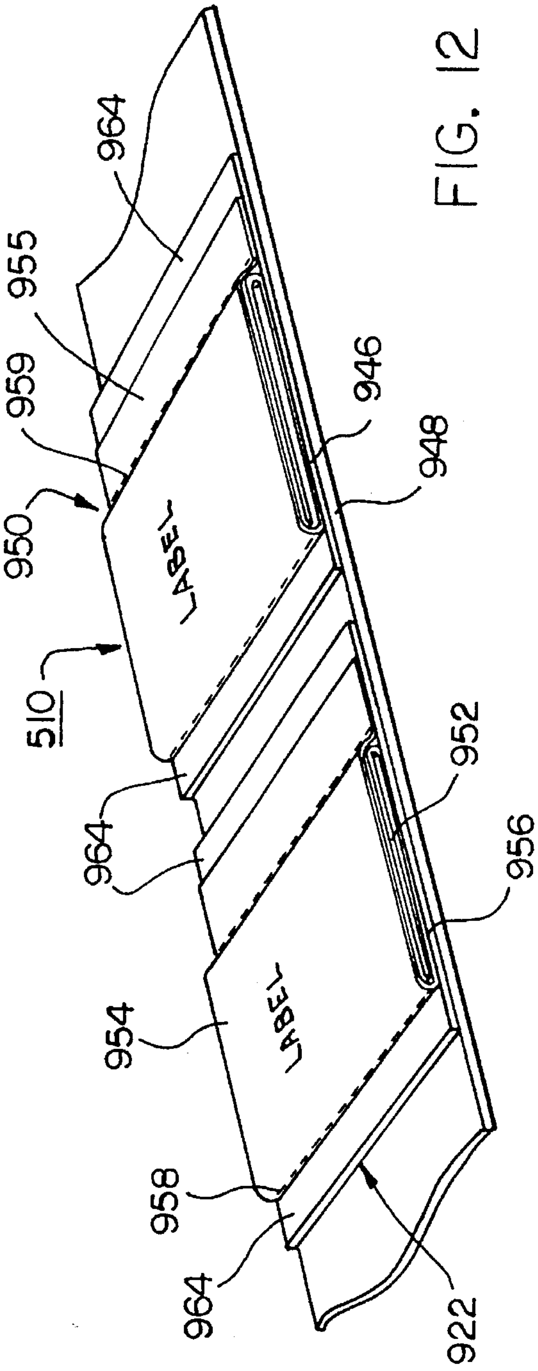
FIG. 12 is a perspective view of a sixth embodiment according to the present invention.

Referring now to FIGS. 9, 11, and 12, fourth, fifth, and sixth embodiments of the present invention, respectively, are shown therein, each being formed from adhesive transfer tape rather than the double coated tape of FIGS. 1–8. Label 310 of FIG. 9 includes a film laminate cover. Label 410 of FIG. 11 is unlaminated and is formed without a border surrounding the outsert. Label 510 of FIG. 12 is likewise unlaminated but includes a border 964 surrounding the outsert in which the adhesive has been removed.

Figure 10:
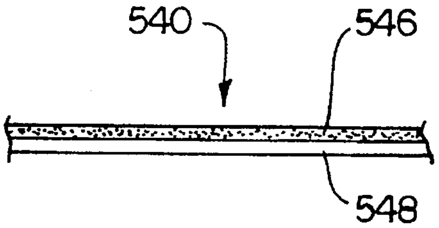
FIG. 10 is a side elevational view of a section of the adhesive transfer tape of the present invention.

The transfer tape 540 is best seen in FIG. 10. Tape 540 includes liner 548 and adhesive layer 546. Preferably, liner 548 includes a silicon coating on both sides. Adhesive layer 546 is preferably formed from pressure sensitive adhesive. Transfer tape such as 3M Product #9447, 1 millimeter high tenacity tape with 320 adhesive is exemplary of one product which may be used. Transfer tapes having a second release liner layer located on adhesive layer 546 may also be used. Note that the relative size of the tape and thickness of the adhesive layer have been exaggerated in the drawings for the sake of clarity. Preferably, layer 546 which remains with label 310 when the same is removed from liner 548 will appear as a thin adhesive film on the lower surface of the bottom panel of the outsert.

Referring now to FIGS. 9 and 10 in general and to FIG. 9 in particular, a fourth embodiment of the label of the present invention, generally denoted 310, is shown therein. The numerals 558, 554, 550, 559, 555, 552, 556, and 557 indicate elements which correspond to elements 58, 54, 50, 59, 55, 52, 56, and 57 of the first embodiment, respectively. Label 310 includes a supporting patch 522 formed from adhesive 546 which is releasably secured to release liner 548, and outsert 550 which is secured to the top of patch 522. Laminate cover 560 covers both outsert 550 and its support patch 522.

Patch 522 is somewhat larger than outsert 550, thereby forming borders 562. Film layer 560 is formed by a preferably clear film secured to patch 522 along the peripheral portion of adhesive layer 546 located in borders 562. Film layer 560 preferably includes adhesive on its inner surface. Laminate 560 serves to protect outsert 550 from damage during handling of the package. Laminate 560 is provided with a perforation 561 to facilitate access to the outsert. Preferably, laminate 560 has a thickness in the range of 2–3 mil to facilitate application of labels 310 from the release liner to packages. The increased thickness helps to reduce buckling of the laminate due to the thickness of the outsert and the large amount of adhesive present on the transfer tape.

Figure 4:
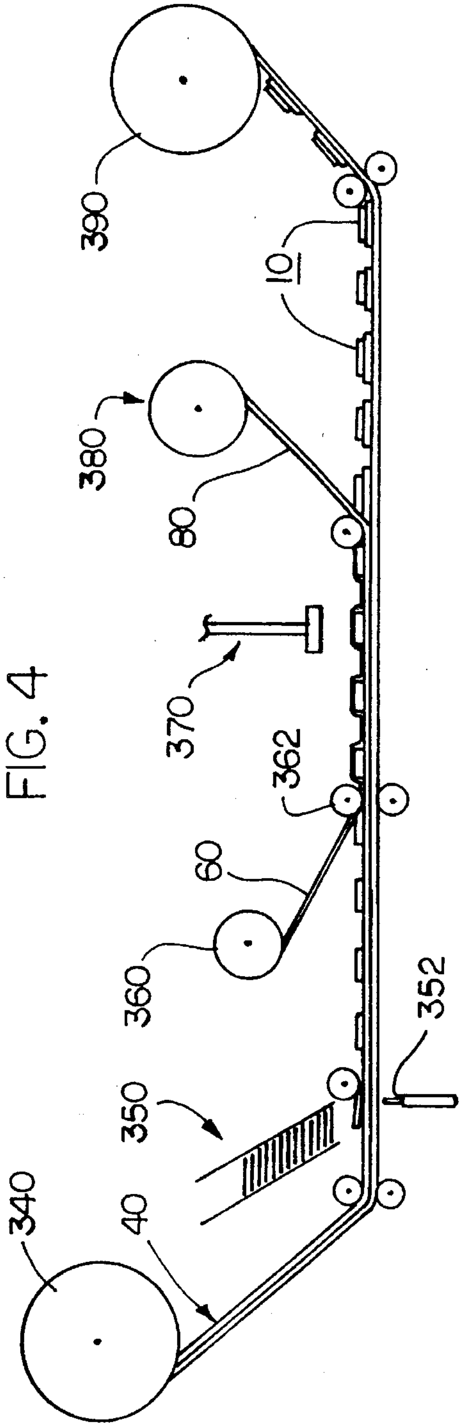
FIG. 4 is a diagrammatic side elevational view of an apparatus adapted to produce the labels of FIGS. 1–3.

Label 310 according to the fourth embodiment may be constructed using the same apparatus as used to construct label 10 as shown in FIG. 4, and by the same method except that tape 540 is substituted for double coated tape 40. In this case the cut line formed by diecutter 570 extends down through adhesive layer 546 to release liner 548. Similarly, the release liner and labels may be wound onto take-up roller winding station 390 or fan folded into a stack. Multiple individual outserts may be placed across the web by multiple outsert applying stations (not shown) spaced across the web. The web may thereafter be slit into a plurality of individual webs having labels thereon. It will be appreciated that because all of adhesive layer 546 has been either removed or covered by laminate 560, the liner and labels may be subsequently unwound for use without binding. Again, it will be appreciated that the method as described allows a margin of error for placement of the outsert and location of the diecut.

If multiple up books 90, as best seen in FIG. 13, are used to produce labels according to the fourth, fifth, or sixth embodiments (discussed below) removal of the outsert waste portion 96 (the margin of book material between respective individual outserts) will be more difficult. This is because the transfer tape lacks the carrier layer and the integrity provided thereby which aided in the removal of this waste in the production of labels according to the first, second, and third embodiments. With this draw-back of transfer tape in mind, the following method may be used for forming labels according to the fourth embodiment using multiple up books.

Figure 14:
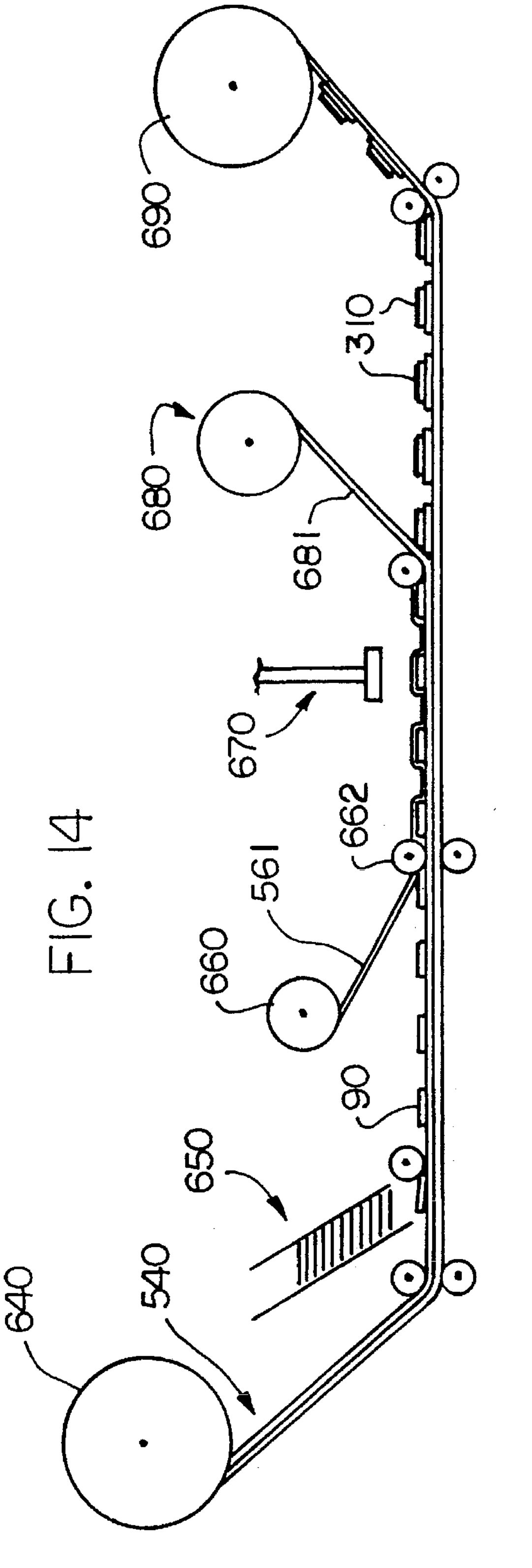
FIG. 14 is a diagrammatic side elevational view of an apparatus adapted to produce the labels of FIG. 9 using multiple up books.

With reference to FIGS. 13 and 14, labels 310 according to the fourth embodiment may be formed by first unwinding the transfer tape 540 from unwinding station 640. A multiple up book 90 is then placed on the adhesive layer by booklet applying station 650. A clear laminate 561 having adhesive on the side facing the transfer tape is then applied by laminate unwind station 660 over the transfer tape and the multiple up books. Tape 540, books 90, and laminate 561 are then passed through nip rollers 662. The laminate and books are face cut down to the release liner by diecutter 670, creating two or more side-by-side individual outserts 92 from each multiple up book. The waste matrix 681 including the adhesive between the individual outserts and the outsert waste portion between the individual outserts is then removed by rewinding station 680. Labels 310 may then be wound onto a take-up roll by winding station 690. Optionally, the web may be slit into a plurality of webs having labels thereon prior to winding.

A label 410 according to a fifth embodiment of the present invention, best seen in FIG. 11, is formed without the use of a laminate cover. The numerals 758, 754, 750, 759, 755, 746, 756, 748, and 757 indicate elements which correspond to elements 558, 554, 550, 559, 555, 546, 552, 556, 548, and 559, respectively, of the fourth embodiment. Label 410 includes a patch 720 identical to patch 522 of the fourth embodiment except that patch 720 is sized and shaped to fit at or within the periphery of outsert 750. It will be appreciated that because outsert 750 covers all of the adhesive layer 746 of patch 720, the liner and labels may be rolled and unrolled without binding.

Figure 6:
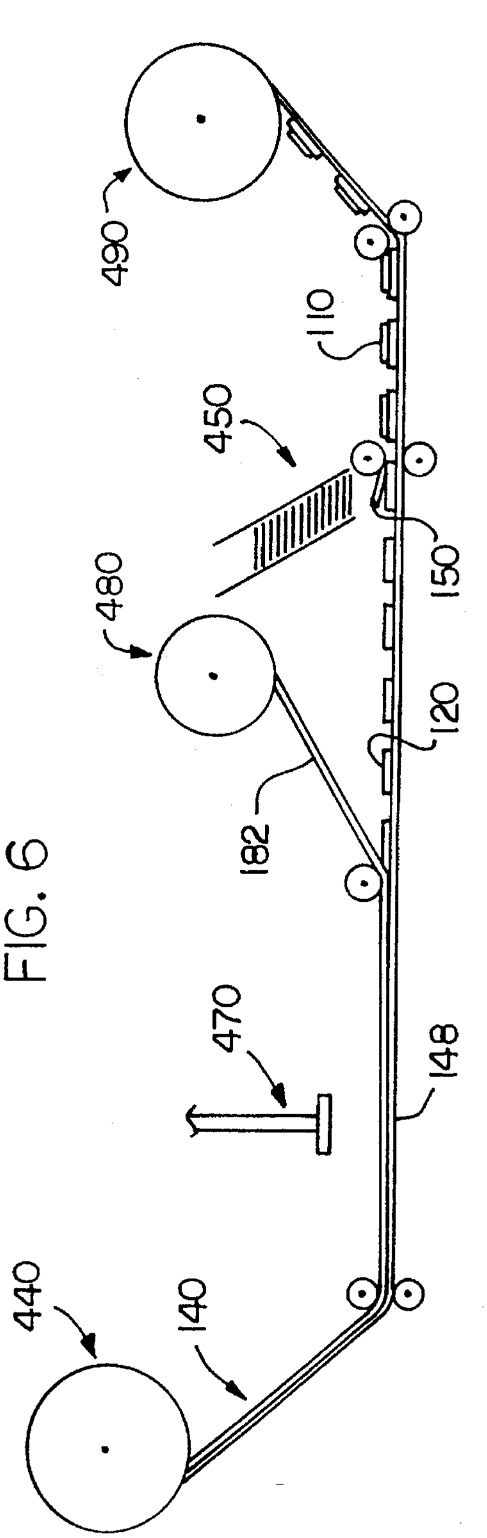
FIG. 6 is a diagrammatic side elevational view of an apparatus adapted to produce the labels of FIG. 5.

Labels 410 of the fifth embodiment may be constructed using the same apparatus as used to construct label 110 as shown in FIG. 6 and by the same method except that tape 740 is substituted for double coated tape 140. Removal of the waste adhesive may be accomplished by applying a laminate to the construction, passing the construction with laminate through a nip roller, and removing the laminate and excess adhesive along with it. Multiple, individual outserts may be placed across the web by multiple outsert applying stations (not shown) spaced across the web. The web may thereafter be slit into a plurality of individual webs having labels thereon.

Figure 15:
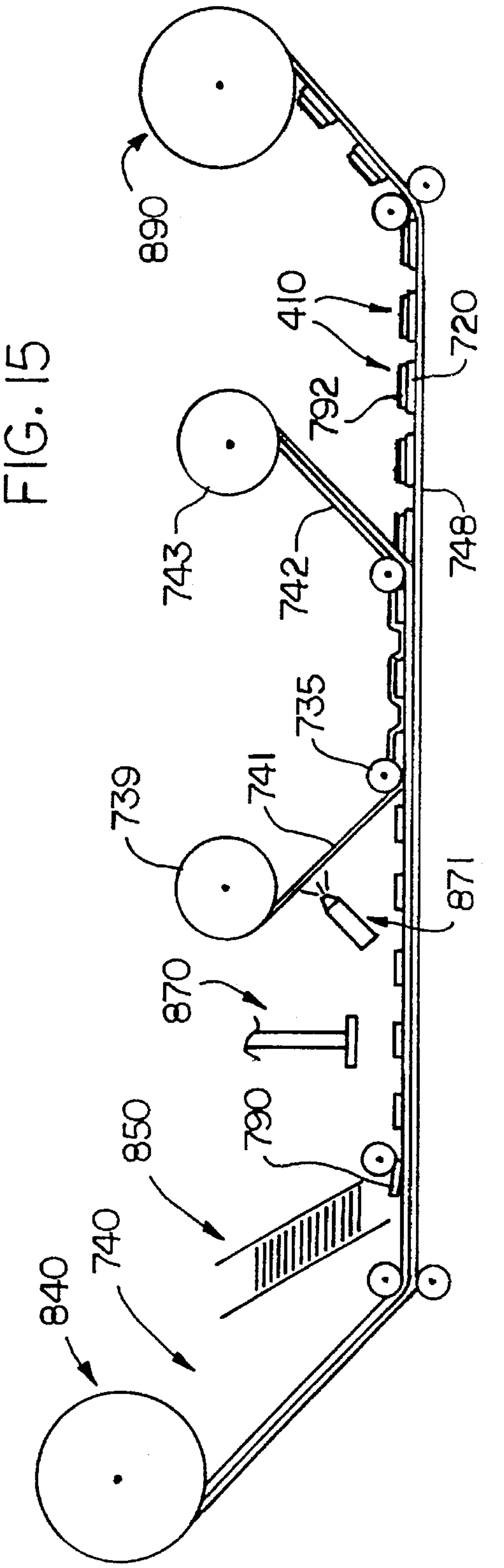
FIG. 15 is a diagrammatic side elevational view of an apparatus adapted to produce the labels of FIG. 11 using multiple up books.

With reference to FIG. 15, labels 410 according to the fifth embodiment may be produced using multiple up books using the following method. First, the transfer tape web 740 is unwound from winding station 840 and multiple up books 790 are placed thereon by booklet applying station 850. The multiple up books are then face cut by cutter 870, creating the foot print of the individual outserts and the respective labels 410. Next, a second web of clear laminate material 741 having no adhesive is unwound. The clear laminate is run through a print station 871 which applies band or bands of adhesive in the web direction. The bands are sized and configured to run between each of the individual outserts and adjacent the outer edges of the end outserts if outsert waste portions are present there. Next, the clear laminate material with the adhesive bands is laminated by laminate unwind station 739 to the transfer tape and outserts. The construction is then passed through a nip roller 735 and the laminate material is removed by removal station 743. Removal of the laminate material will pull up the exposed adhesive between the multiple outserts and pull away the outsert waste portion between the outserts (collectively, waste matrix 742). Only the individual outserts 792 and their respective adhesive patches 720 remain on liner 748. The liner with labels thereon may then be slit into two or more webs and/or wound onto a roll by winding station 890.

Labels 510 according to a sixth embodiment of the present invention, as best seen in FIG. 12, may be formed without a laminate cover while still providing a patch 922 which extends beyond the periphery of outsert 950. The numbers 958, 954, 950, 959, 955, 956, 946, 948, 952, and 922 indicate elements which correspond to elements 558, 554, 550, 559, 555, 556, 546, 548, 552, and 522, respectively, of the fourth embodiment. Label 510 includes patch 922 which is larger than outsert 950 such that borders 964 extend beyond the edges of outsert 950. The portions of adhesive layer 946 which make up borders 964 are treated with a deadening agent such that they are no longer adherent. It will be appreciated that labels 510 mounted on release liner 948 may be rolled and unrolled without binding because no adherent adhesive is exposed.

Labels 510 according to the sixth embodiment may be formed using the same apparatus as used to construct label 210 as shown in FIG. 8, and by the same method except that tape 940 is substituted for double coated tape 240. Multiple individual outserts may be placed across the web by multiple outsert applying stations (now shown) spaced across the web. The web may thereafter be slit into a plurality of individual webs having labels thereon. Again, it will be appreciated that the method as described provides a margin of error for locating the outserts and the cut lines.

Figure 16:
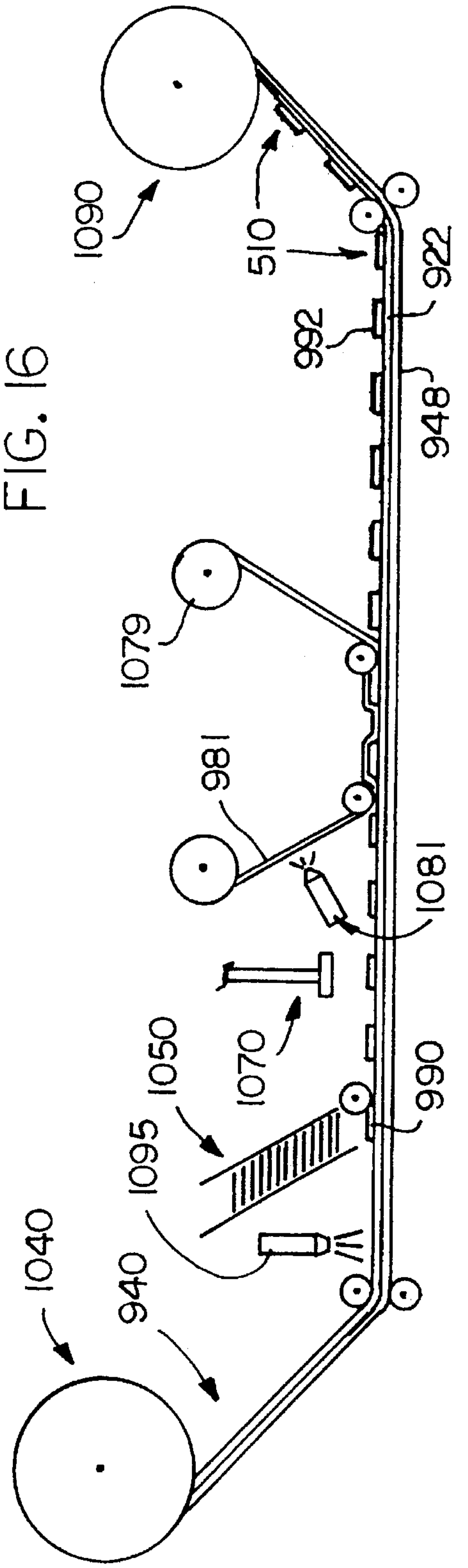
FIG. 16 is a diagrammatic side elevational view of an apparatus adapted to produce the labels of FIG. 12 using multiple up books.

With reference to FIG. 16, labels 510 according to the sixth embodiment may be produced using multiple up books 990 using the following method. First, adhesive deadener is applied to the unwound transfer tape web 940 at areas where no books are to be applied by means of coating station 1095. Next, the multiple up books 990 are placed on the web by book applying station 1050. The multiple up books are then face cut down to the release liner by cutter 1070 to form individual outserts 992. As in the previous method, bands of adhesive are applied to a clear laminate material 981 by print station 1081 and the laminate material is then laminated to the transfer tape using nip roller 935. Thereafter, the laminate material is removed by removal station 1079, taking up the outsert waste portions and any exposed, non-deadened adhesive therewith. Optionally, the liner with labels thereon may be slit into two or more webs and/or wound onto a roll by winding station 1090.

As an alternative to unrolling prefabricated transfer tape as disclosed above, the transfer tape may be formed as part of the label forming process. First, a release liner is unwound and the upper surface thereof is coated by a coating station with an adhesive as discussed above. The transfer tape thus formed is thereafter manipulated as described above.

It will be appreciated that labels according to any of the above-described methods can be packaged by winding or fan-folding without exposing the title panel to exposed, activated adhesive, because all of the adhesive not covered by the bottom panel is either covered, deadened, or removed.

It will be appreciated that in each of the methods described above, if a transfer tape of the type having a second release liner is used, the second liner will be removed as a part of the unwinding step.

In any of the methods discussed above, it may also be advantageous to apply adhesive deadener to the double coated tape or to the transfer tape prior to applying the outserts. In particular, one may wish to apply adhesive deadener in areas immediately adjacent to the folded edge side of the outserts. The reason for this is that the folded outserts tend to create a certain amount of bulkiness, and it may be difficult to remove the exposed adhesive immediately next to these locations. In each of the above-described methods, it may be necessary to bring the exposed adhesive layers of the double coated tape or the transfer tape into contact with rollers. Preferably, these rollers are coated with a teflon coating to repel the adhesive and avoid gumming.

In embodiments one and four discussed above, it may be desirable to add a second tear line in the laminate cover adjacent the edge of the outsert opposite the first tear line. With such provision, a user may tear the first tear line, remove the outsert, and then remove the flap of laminate cover by tearing along the second tear line. It will be appreciated that only the remnants of the laminate cover will remain on the package.

What is claimed is:

1. A label product, comprising:

(a) a web of transfer tape, said web including a release liner having an upper surface and a layer of release adhesive thereon;

(b) a plurality of unitary outserts affixed at spaced positions along said web, each of said outserts having a bottom panel;

(c) each of said bottom panels being directly adhered to said upper surface by said release adhesive layer; and (d) wherein each of said bottom panels is releasably secured to said upper surface of said release liner by said release adhesive layer;

(e) a plurality of laminate covers each overlying a respective one of said outserts, each of said laminate covers including;

(i) a central portion overlying said respective outsert;

(ii) first and second marginal portions disposed on opposite sides of said central portion, said first marginal portion extending beyond a side edge of said respective outsert and releasably secured to said upper surface of said release liner by said tape adhesive layer; and (iii) a removal tear line formed in said first marginal portion adjacent said side edge of said respective outsert whereby said central portion may be torn away from said first marginal portion and said label product; and (f) means for accessing said outserts formed adjacent side edges of said outserts opposite each of said removal tear lines.

2. A label for affixing to an article, said label comprising:

(a) a unitary outsert including:

(i) a bottom panel having an upper surface and a lower surface;

(ii) a title panel having an upper surface, said title panel detachably secured to said bottom panel by a first tear line formed in a side edge of said outsert; and (iii) at least one intermediate panel detachably secured to said bottom panel;

(b) a first adhesive layer disposed on said lower surface of said bottom panel;

(c) a laminate cover having a lower surface and a second adhesive layer on said lower surface, said laminate cover further comprising:

(i) a central portion overlying said outsert and permanently secured to said upper surface of said title panel by said second adhesive layer;

(ii) first and second marginal portions disposed on opposite sides of said central portion, said first marginal portion adhered to said article by said first adhesive layer; and (iii) a removal tear line formed in said first marginal portion adjacent said side edge whereby said central portion may be torn away from said first marginal portion and said label;

(d) wherein said bottom panel is directly affixed to the article by means of said first adhesive layer and said title panel and said intermediate panel may be selectively detached from said bottom panel and the article;

(e) means for accessing said outsert formed adjacent a side edge of said outsert opposite said removal tear line; and (f) whereby said central portion and said title panel may be removed from said label by opening said label using said access means and tearing along said first tear line and said removal tear line.

3. The label of claim 2 wherein said intermediate panel and said title panel are detachably secured to said bottom panel by perforations.

4. The label product of claim 1 wherein said access means includes a plurality of access tear lines formed in each of said second marginal portions and overlying said respective outserts.

5. The label product of claim 4 wherein each of said outserts further includes a title panel overlying said bottom panel and detachably secured to said bottom panel by an outsert tear line formed in said side edge of said outsert, each of said title panels including an extended flap extending beyond said bottom panel and releasably adhered to said upper surface of said release liner by said release adhesive layer, each of said title panels further including an extended flap tear line formed therein adjacent said extended flaps, and wherein each of said second marginal portions are adhered to said extended flaps by said laminate adhesive, each of said access tear lines disposed adjacent a respective one of said extended flap tear lines.

6. The label of claim 2 wherein said title panel is detachably secured to said bottom panel by perforations.

7. The label of claim 2 wherein said access means includes an access tear line formed in said second marginal portion and overlying said outsert.

8. The label of claim 7 wherein said title panel includes an extended flap extending beyond said bottom panel and affixed to the article by means of said first adhesive layer, said title panel further including an extended flap tear line formed therein adjacent said extended flap, and wherein said second marginal portion is adhered to said extended flap by said second adhesive layer, said access tear line disposed adjacent said extended flap tear line.

9. A label product, comprising:

(a) a web of transfer tape, said web including a release liner having an upper surface and a layer of adhesive thereon;

(b) a plurality of outserts affixed at spaced positions along said web, each of said outserts having a bottom panel;

(c) said adhesive layer interposed between said upper surface and each of said outserts;

(d) wherein each of said outserts is releasably secured to said upper surface of said release liner by said adhesive layer; and (e) wherein at least a portion of said adhesive layer is not covered by said outserts and is substantially fully coated with an adhesive deadener, said adhesive deadener being exposed to provide a substantially non-tacky border adjacent each outsert.

10. The label product of claim 9 wherein each of said borders comprises a transverse strip extending across said release liner between adjacent outserts, each of said outserts including a folded edge and each of said transverse strips disposed adjacent said folded edge of a respective outsert.

* * * * *